March 23, 1971 S. ROGER 3,572,201
MACHINE FOR PRODUCING TOOTHPICKS
Filed Nov. 15, 1968 3 Sheets-Sheet 1

March 23, 1971  S. ROGER  3,572,201
MACHINE FOR PRODUCING TOOTHPICKS
Filed Nov. 15, 1968  3 Sheets-Sheet 2

United States Patent Office 3,572,201
Patented Mar. 23, 1971

3,572,201
MACHINE FOR PRODUCING TOOTHPICKS
Soyez Roger, La Celle-sur-Loire, Nievre, France, assignor to Soyez Freres Donzy, Nievre, France
Filed Nov. 15, 1968, Ser. No. 776,164
Claims priority, application France, July 16, 1968, 159,394
Int. Cl. B26d 7/06; B23d 21/02, 21/04
U.S. Cl. 83—119
23 Claims

ABSTRACT OF THE DISCLOSURE

A machine for producing toothpicks from tubes of synthetic material comprising an automatic feeding and orienting mechanism for feeding individual tubes to a cutting device which acts to cut the point and heel of the toothpick to the required profile. An arrangement is provided for automatically transporting each formed toothpick from the cutting station to a wrapping device.

The present invention relates to a machine for manufacturing toothpicks.

The traditional manufacture of a toothpick from a feather comprises an operation for dividing the entire feather in order to separate the quill of the feather from the plumes which constitute the upper part of the feather which has the barbs, then an operation for cutting the quill by means of a knife composed of two blades suitably arranged so as to cut the quill, thus forming the point and the heel of the toothpick, the quill being placed manually under the knife which is moved in a vertical plane by means of a cam.

There have already been attempts to simplify this process using a tube of synthetic material instead of a feather. By this means the separating operation is avoided, since the tube is subjected directly to the cutting operation.

But in its traditional conception this cutting operation is the most difficult part of the method of manufacture.

One object of the present invention is to provide a machine which makes it possible to carry out the cutting operation automatically in the manufacture of toothpicks.

Another objects of the invention is to provide a machine which makes it possible to cut toothpicks continuously from tubes of synthetic material.

Another object of the invention is to provide a machine fed with tubes of synthetic material and with paper, which delivers, automatically and continuously, wrapped toothpicks.

According to the present invention there is provided a machine for cutting toothpicks from tubes of synthetic material, comprising cutting means having the desired profile for the toothpicks, at least one slot suitable for containing a tube between two parallel members defining the profile of a toothpick, and transporting means for passing the slot underneath the cutting means in such a way that the latter conforms to the profile of the said parallel members exactly.

Preferably, the machine has a plurality of slots provided in the surface of an endless rotatable elements, preferably a drum, which constitutes said transporting means.

Preferably also, the machine has cutting means which comprises a mobile device having at least one slot for receiving a tube, and two fixed cutting tools arranged at a location along the path of the mobile device above the said slot, said slot being adapted to retain a tube between two lateral walls running parallel to the length of the tube and perpendicular to the direction of movement of the device relative to the tools, the upper surfaces of the said lateral walls each having a profiled portion corresponding to the desired profile for the point of the toothpick and a profiled portion corresponding to the desired profile for the heel of the toothpick, said portions being hollowed in relation to the tube in place in the slot, and said cutting tools having cutting profiles corresponding to the profile of the point and to the profile of the heel of the toothpick respectively, said cutting tools being arranged in such a way that when the slot passes under the cutting tools, each of said parts of the upper surfaces of the slot mates with the corresponding profiles of the cutting tools, the tools thus cutting the toothpick tube in the manner of a punch.

An embodiment of the invention will now be described, by way of example, with reference to the accompanying drawings in which.

Figure 1:
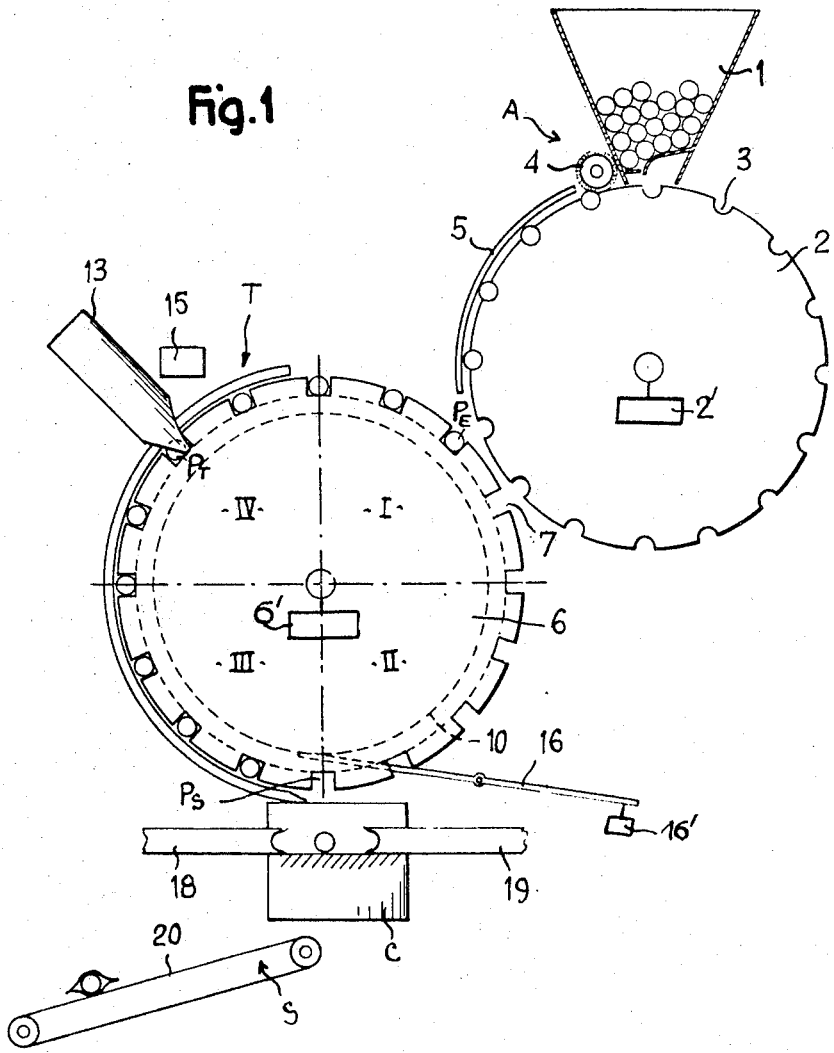
FIG. 1 is a diagrammatic representation of a machine for manufacturing toothpicks in accordance with the invention.

The machine shown diagrammatically in FIG. 1 has a feeding and sorting apparatus A which receives the tubes of synthetic material and which supplies them in the required order and position to the next part of the machine.

This next part, a characteristic feature of the machine of the invention, is a part T where the sorted tubes coming from the feeding device pass and are cut automatically during their passage.

At the outlet of the cutting part T the machine includes a wrapping device C where the tubes cut in the form of toothpicks coming from the preceding cutting device are wrapped in paper.

Finally the machine has an outlet part S which receives the wrapped toothpicks from the wrapping device and which ejects them from the machine.

The feeding apparatus A of the machine has a hopper 1 which receives the tubes suitably arranged, and feeds them to a separating and orienting mechanism which supplies them in succession and parallel to a given direction.

This separating and orienting mechanism comprises a channeled drum 2 located beneath the hopper and which has on its cylindrical periphery successive channels 3 evenly spaced and directed axially. The tubes fall by gravity from the hopper into the channels 3 and a rotating brush 4 distributes in the channels at a rate depending on the speed of rotation of the drum 2. The channels 3 are each approximately semi-cylindrical in shape with a larger diameter than that of a tube and a shorter length than that of a tube.

During the rotation of the drum 2, the tubes present in the channels 3 are retained in the channels by a guide member 5, constituted by a member which is essentially parallel to the cylindrical surface of the drum and in contact with this surface over a part of this surface between the outlet of the hopper and the inlet of the next device of the machine, an inlet which in the example taken is situated substantially at 90° from the outlet of the hopper.

The next device, or cutting means comprises a second drum 6 having its axis parallel to that of the first drum 2 and the cylindrical surface of which is provided with axially directed slots 7.

The drum 6 is located close to and lower than the drum 2 in such a way that the tubes present in the channels 3 of the drum 2 fall one by one into the slots 7 of the drum 6 which has the same direction of rotation and the same rotational speed as the drum 2.

Figure 3:
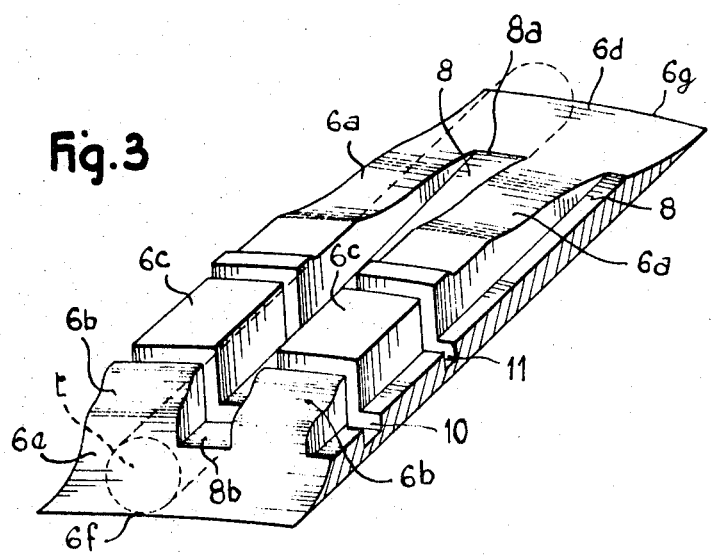
FIG. 3 is an enlarged partial perspective view of the drum of the cutting means of the machine showing the construction of slots provided in the cylindrical surface of the drum.
Figure 2:
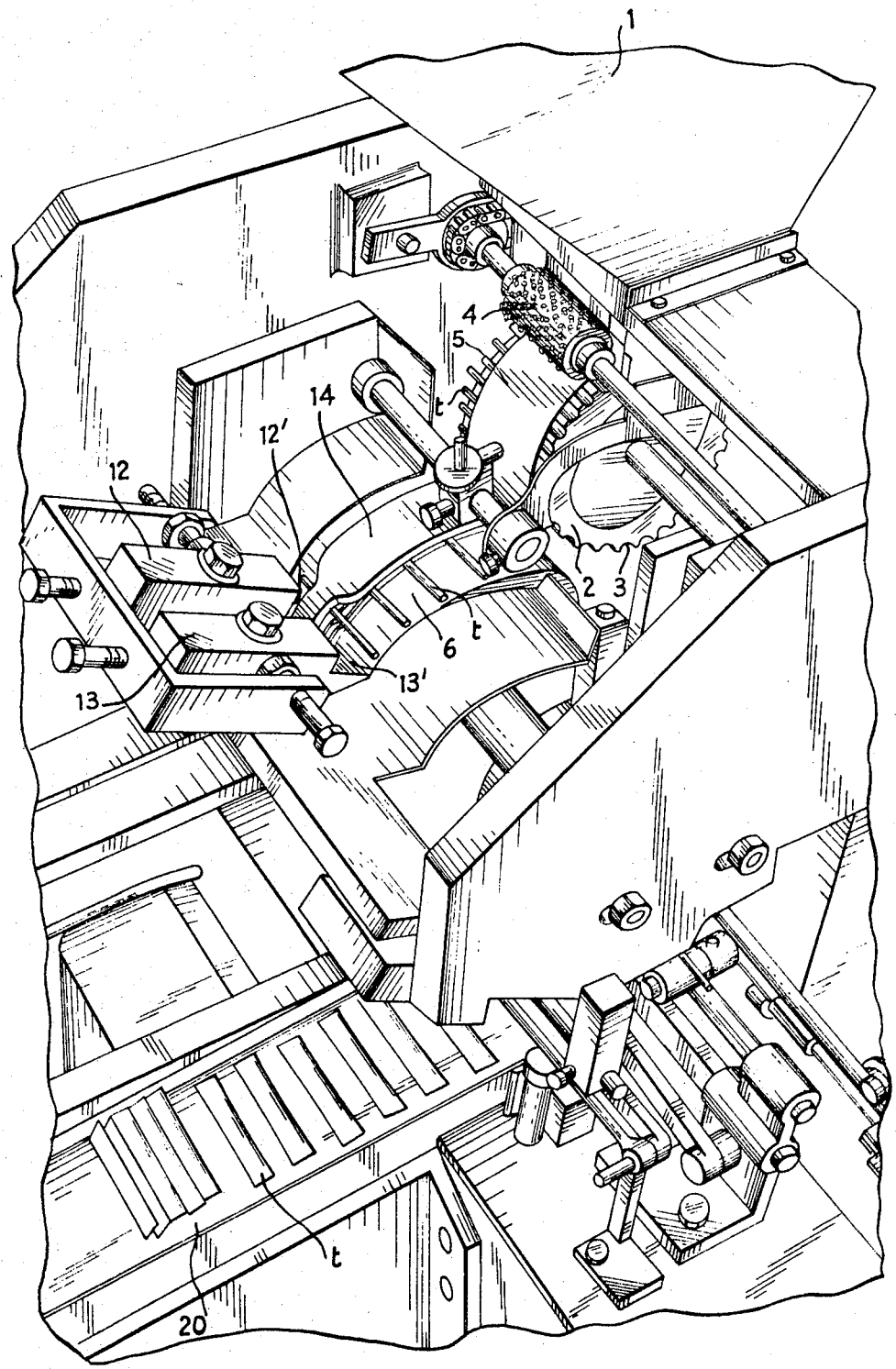
FIG. 2 is a perspective view of part of the feeding apparatus and of the cutting means of the machine of FIG. 1.

The slots 7 provided in the cylindrical surface of the drum 6, which is of treated steel, are each defined by longitudinal walls running parallel to the axis of the drum and which comprise (FIGS. 3 and 4) a flat base 8 flanked by two parallel lateral or side walls 9 perpendicular to the flat base and the upper surfaces of which are each of a shape corresponding to the desired profile for the toothpick.

More precisely, these upper surfaces have at one end a portion 9a, 9'a of a profile corresponding to the profile desired for the point of the toothpick and at their other end a portion 9b, 9'b of a profile corresponding to the desired profile for the heel of the toothpick with an intermediate rectilinear portion 9c, 9'c between these two portions.

The upper surface of the side walls of each slot slopes downwards towards the flat base 8 starting from the central rectilinear portion 9c, 9'c in the direction of each of the ends of the slot until it rejoins the flat base 8.

The flat base of the slot, in the case of the illustrated machine, does not go as far as the edges 6f, 6g of the drum 6, and the cylindrical wall of the drum in the areas 6d, 6e between the end parts 8a, 8b of the base wall of the slot, and the corresponding edges 6a, 6b of the drum are hollowed in relation to this flat base for reasons which will be explained below.

The surface of the drum between the slots is a cylindrical surface. Thus the surface of the drum is a cylindrical surface determined by a generatrix of which at least one portion is the profile of a toothpick, this cylindrical surface being interrupted from place to place by slots regularly distributed on the periphery of the drum and directed parallel to the axis of the drum.

More precisely the surface of the drum 6 is constituted by an annular cylindrical portion 6a, the generatrix of which has the desired profile for the point of the toothpick and of an annular cylindrical portion 6b, the generatrix of which has the desired profile for the heel of the toothpick, these two portions being separated by an annular cylindrical portion 6c, the generatrix of which is rectilinear, these three portions being interrupted by the slots 7 parallel to the axis of the drum and regularly distributed on the periphery of the drum, slots which are each delimited by a flat base 8 tangential to a theoretical cylinder which would have the same axis as the drum and a smaller diameter than that of the drum and by means of side walls 9, 9' which are perpendicular to this flat base.

Finally the cylindrical surface of the drum has two grooves 10, 11 which run on the periphery of the drum and are located between the shaped annular cylindrical portions 6a, 6b and the central annular portion 6c, grooves which are orthogonal to the slots, and which are deeper than the slots. The role of these grooves will be described below.

The maximum depth of a slot, i.e. the depth of the slot in the region of the rectilinear portions of the side walls of the slot is essentially equal to the diameter of a tube.

The length of a slot is less than the length of a tube.

The width of a slot corresponds to the diameter of a tube.

Figure 5:
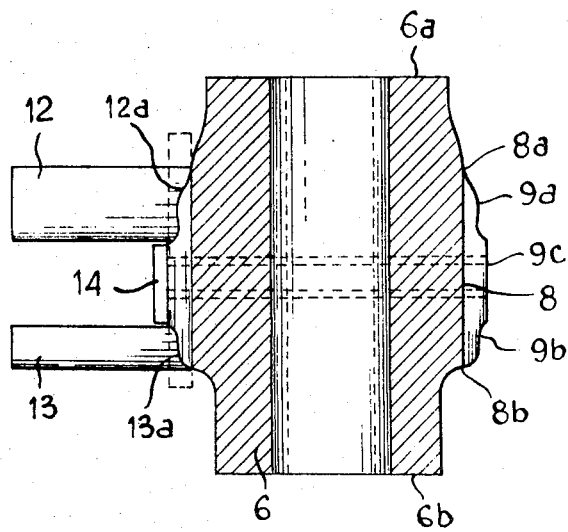
FIG. 5 is a view of the cutting means of the machine on the line V—V of FIG. 1, showing the structure and the arrangement of the cutting tools.

The cutting means comprises two fixed cutting tools 12, 13 constituted by two blades of treated steel which have two cutting edges 12', 13', the cutting profiles of which (FIG. 5) correspond to the profile of the point and to the profile of the heel of the toothpick respectively, and these tools in relation to the drum 6 are placed in positions such that when the drum 6 turns about its axis, the slots 7 pass under the cutting edges so that the shaped parts 9a, 9b of each side wall of a slot exactly fit the cutting edges 12' and 13' of corresponding shape when the wall passes under the cutting edges, with just the necessary clearance between this wall and the cutting edges to allow rotation of the drum.

In the case illustrated where the cylindrical wall of the drum of the cutting device has cylindrical annular portions, the generatrices of which are the profile of the point and the profile of the heel of the toothpick respectively, the cutting edges of the tools lightly contact these portions, the shapes of which they fit exactly, during the rotation of the drum.

The tools of the machine co-operate with the shape of the slots of the drum in order to cut the toothpick tubes in the manner of a punch, and the removal of the ends of the tube which the tools cut off is facilitated by the fact that the annular surfaces 6d and 6e of the drum are hollowed in relation to the bases of the slots.

Furthermore the machine may have a suction device for absorbing the waste of the tubes and for putting this waste in a suitable bag at the moment of cutting the toothpick. A suction device of this type which is known is only shown diagrammatically at 15 in FIG. 1.

It should be noted that the cutting process is quite different from that used in the standard manufacturing process where the cutter is not shaped and is moved perpendicularly to the tube which is fed to it manually.

In order to prevent the tubes from leaving the slots of the drum inadvertently before, during or after their cutting, the cutting device includes a device for keeping the tubes in the slots which is simply constituted by a part 14 which exactly fits the shape of a portion of the central cylindrical portion 6c of the rectilinear generatrix of the cylindrical wall of the drum and which extends along and close to this portion in advance of and subsequent to the location of the tools.

The guide constituted by the shaped part 14 retains the toothpicks until they are ejected from the drum, this ejection taking place when the slot which received the tube in a given high position (PE), has passed through a cutting position (PT) where the tube is cut by the tool to form a toothpick, and arrives in a given low position (PS).

The cutting position is for example at approximately 90° in the direction of rotation of the drum, from the feed position of the slot, and the ejecting position of the slot is for example 135° from the cutting position, the position for ejection being preferably the lowest position through which the slot passes during the rotation of the drum.

Generally each slot is filled when it passes into what corresponds to the first quadrant I (FIG. 1), and is emptied when it passes into what corresponds to the third quadrant III. The cutting of a tube takes place when the slot passes into the fourth quadrant IV, the drum rotating in anti-clockwise direction.

The cutting device has an arrangement which facilitates the removal of the toothpicks from the cutting device.

Figure 4:
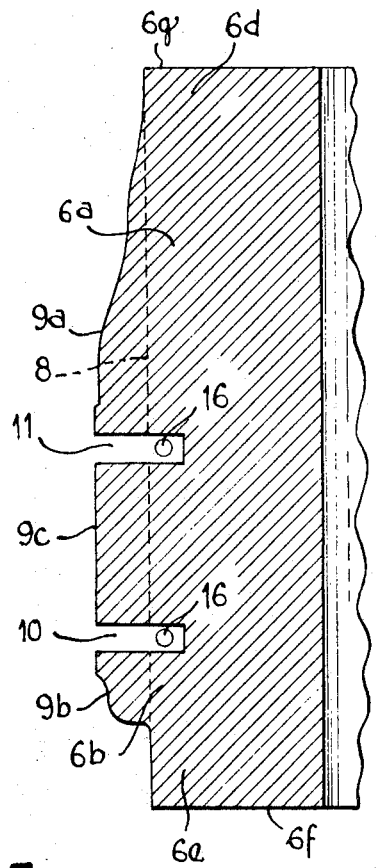
FIG. 4 is a plan view of the shape of a lateral wall of a slot of the drum of the cutting device of the machine.

This arrangement, as shown best in FIGS. 1 and 4, comprises a control device 16' which actuates two rods 16, the ends of which pass respectively into the bottom of the grooves 10 and 11 on the underside of the drum 6 and which on being deflected downwards under the control of the device 16' causes the toothpick to fall from the slot as it reaches the low position PS, this toothpick then being fed to a wrapping device C which includes for example jaws 18, 19 which grasp the toothpick and a pusher (not shown) which supplies the toothpick, grasped in this way, to a piece of paper previously prepared in a wrapping machine of a standard type.

The wrapped toothpick is ejected at the outlet of the machine by any suitable means, for example an endless conveyor 20.

The embodiment described above is designed to work stepwise; a control device, shown only as the rectangle 6' in FIG. 1, turns the drum stepwise, for example in such a way that the drum is indexed approximately once per second by an amount necessary for passing a tube under the cutting tools, with, between two successive steps, a dwell period during which the toothpick having arrived at the ejection point is ejected by the removal mechanism 16, 16', of which the control device 16 is constructed for this purpose.

The drum 2 is also driven stepwise, under the control of a mechanism shown only by the rectangle 2', in such a way that a regular feeding of the drum 6 by the drum 2 is achieved taking into account the respective diameters and the respective numbers of channels and slots which may be equal or different.

In practice it is generally the capacity of the wrapping device which determines the general capacity of the machine, and thus imposes the number of cuts per minute.

The parts 2', 6' and 16' are not described in detail, since their functions have been sufficiently specified so that their construction with standard means can be realised without difficulty.

I claim:

1. A machine for cutting toothpicks from tubes of synthetic material, said machine comprising driving means, and cutting means comprising a mobile device driven by said driving means and having at least one slot for receiving a tube, and two fixed cutting tools arranged at a location along the path of the mobile device above the said slot, said slot being adapted to retain a tube between two lateral walls running parallel to the length of the tube and perpendicular to the direction of movement of the device relative to the tools, the upper surfaces of the said side walls each having a profiled portion corresponding to the desired profile for the point of the toothpick and a profiled portion corresponding to the desired profile for the heel of the toothpick, said portions being hollowed in relation to the tube in place in the slot, and said cutting tools having cutting profiles corresponding to the profile of the point and to the profile of the heel of the toothpick respectively, said cutting tools being arranged in such a way that when the slot passes under the cutting tools, each of said profiled portions of the upper surfaces of the slot mates with the corresponding profiles of the cutting tools, the tools thus cutting the toothpick in the manner of a punch.

2. A machine according to claim 1 wherein said mobile device is an endless device.

3. A machine according to claim 1 wherein said endless device is a drum rotatable about an axis and including a plurality of slots spaced over its surface.

4. A machine according to claim 3 wherein the slots provided in the surface of the drum of the cutting means are each defined by longitudinal walls running parallel to the axis of the drum and which include a flat base flanked by two parallel side walls which are perpendicular to the flat base and the upper edges of which each have a profile corresponding to the desired profile of the toothpick.

5. A machine according to claim 1 wherein the said upper edges have at one end a profiled portion corresponding to the desired profile of the point of the toothpick and at their other end a profiled portion corresponding to the desired profile of the heel with an intermediate rectilinear portion between these two profiled portions.

6. A machine according to claim 4, wherein the upper edge of the side walls of each slot slopes downwardly toward the flat base of the slot from the central rectilinear portion, toward each of the ends of the slot, until said upper edge rejoins the flat base.

7. A machine according to claim 3 wherein the surface of the drum is a cylindrical surface determined by a generatrix, at least one portion of which is the profile of a toothpick, said cylindrical surface being interrupted from place to place by slots regularly distributed on the periphery of the drum and disposed parallel to the axis of the drum.

8. A machine according to claim 3, wherein the surface of the drum is constituted by an annular cylindrical portion, the generatrix of which has the desired profile for the point of the toothpick, and of an annular cylindrical portion, the generatrix of which has the desired profile for the heel of the toothpick, these two portions being separated by an annular cylindrical portion, the generatrix of which is rectilinear, these three portions being interrupted by the slots parallel to the axis of the drum and regularly distributed on the periphery of the drum.

9. A machine according to claim 1 wherein the maximum depth of each slot is substantially equal to the diameter of a tube.

10. A machine according to claim 1, wherein the length of each slot is less than the length of a tube.

11. A machine according to claim 1, wherein the width of a slot is substantially equal to the diameter of a tube.

12. A machine according to claim 1, wherein the cutting means comprises a guide for the tubes in the slots.

13. A machine according to claim 12 wherein the guide of the cutting means comprises a portion which conforms to the profile of part of the central cylindrical portion of the rectilinear generatrix of the cylindrical wall of the drum and which extends along and close to this portion in advance of and subsequent to the location of the tools.

14. A machine according to claim 1 wherein the cutting means comprises means for facilitating the removal of the toothpicks from the cutting device.

15. A machine according to claim 14, wherein the means for facilitating removal of the toothpicks comprises a plurality of rods, the ends of which are located on the underside of the drum within grooves formed in the cylindrical surface of the drum, said grooves being orthogonal to the slots and deeper than the slots.

16. A machine according to claim 1, comprising feeding and sorting means for receiving the tubes and supplying them in the order and position required to the cutting means of the machine.

17. A machine according to claim 16, wherein the feeding means comprises a separating and orienting means for receiving the tubes and for supplying them to the cutting means in succession and parallel to a given direction.

18. A machine according to claim 17 wherein the separating and orienting means includes a channeled drum which is provided with its cylindrical periphery a series of regularly-spaced and axially-disposed channels within which the tubes are successively disposed.

19. A machine according to claim 18, wherein the channels are each approximately in the shape of a semicylinder of a greater diameter than that of a tube and of a smaller length than that of a tube.

20. A machine according to claim 18, comprising retaining means for retaining the tubes in the channels during the rotation of the channeled drum.

21. A machine according to claim 20, wherein said retaining means is an element which is substantially parallel to the cylindrical surface of the channeled drum and in contact with this surface at a part of this surface.

22. A machine according to claim 18, wherein the cutting means includes a drum mounted to rotate about an axis and which includes several slots disposed over its surface, and in which the drum of the cutting means has its axis parallel to the drum of the feeding means and is situated close to and lower than the drum of the feeding means whereby the tubes present in the channels fall one by one into the slots, the two drums having the same direction of rotation and the same rotational speed.

23. A machine according to claim 3 wherein control means are provided for indexing the drum of the cutting means in a stepwise manner by an amount necessary to locate a tube under the cutting tools, with, between two successive indexing operations, a dwell period during which a formed toothpick is ejected from the cutting means.

References Cited

UNITED STATES PATENTS

| | | | |
|---|---|---|---|
| 1,200,836 | 10/1916 | Hendrich | 144—12X |
| 1,039,534 | 9/1912 | Heldmann | 83—411X |
| 2,236,150 | 3/1941 | Maltby | 83—411 |

JAMES M. MEISTER, Primary Examiner

U.S. Cl. X.R.

83—411, 926